United States Patent [19]

Kojima

[11] Patent Number: 4,550,338
[45] Date of Patent: Oct. 29, 1985

[54] DETECTING CIRCUIT
[75] Inventor: Kenji Kojima, Itami, Japan
[73] Assignee: Mitsubishi Denki Kabushiki Kaisha, Tokyo, Japan
[21] Appl. No.: 468,881
[22] Filed: Feb. 23, 1983
[30] Foreign Application Priority Data Apr. 22, 1982 [JP] Japan .................................. 57-69012

[51] Int. Cl.[4] .............................................. H04N 9/46
[52] U.S. Cl. ........................................ 358/20; 358/27; 358/28
[58] Field of Search ...................... 358/20, 27, 26, 28, 358/23; 329/50

[56] References Cited
U.S. PATENT DOCUMENTS

| 3,626,089 | 12/1971 | Cecchin | 358/20 |
| 3,651,418 | 3/1972 | Wittmann | 329/50 |
| 3,711,634 | 1/1973 | Portoulas | 358/20 |
| 3,740,456 | 6/1973 | Harwood | 358/27 |

FOREIGN PATENT DOCUMENTS 51-43746 11/1976 Japan .
57-14072 3/1982 Japan .

Primary Examiner—Richard Murray
Attorney, Agent, or Firm—Lowe, King, Price & Becker

[57] ABSTRACT

A detecting circuit comprises a synchronous detecting circuit (11, 12, 15 to 19, 22 and 27 to 29) and a switching transistor (35). The collector and the emitter of the transistor (35) are connected to junctions (A) and (B), respectively, of the synchronous detecting circuit. The input portion (11) of the synchronous detecting circuit is connected to receive a signal to be detected and the input portion (12) of the same is connected to receive a carrier wave. The base of the transistor (35) is connected to receive a switching signal. The synchronous detecting circuit performs a detecting operation when the switching signal assumes the low level; however, the transistor (35) is turned on when the switching signal assumes the high level so that the junctions (A) and (B) are short-circuited, whereby the synchronous detecting circuit does not perform a detecting operation. Accordingly, the detecting circuit can be switched with a simple circuit configuration. A large change in the direct current potential at the junction (A) occurs when the transistor (35) is turned on and off. Accordingly, a sample and hold circuit (40) can also be simplified.

18 Claims, 6 Drawing Figures

DETECTING CIRCUIT

BACKGROUND OF THE INVENTION

1. Field of the Invention

The present invention relates to a detecting circuit. More specifically, the present invention relates to a detecting circuit for use in a circuit for synchronously detecting a chroma signal of a color television.

2. Description of the Prior Art

FIG. 1 is a block diagram showing a portion of a chroma signal processing circuit of a color television receiver which constitutes the background of the present invention. A composite video signal input terminal 1 is connected to the inputs of a bandpass filter 2 and a synchronizing separating circuit 8. The output of the bandpass filter 2 is connected to the first input of a chroma amplifier 3. The output of the chroma amplifier 3 is connected to a first input of a chroma demodulator 4, to a chroma signal input terminal 11 of an automatic color control detecting circuit (hereinafter referred to as an ACC detecting circuit) 5 and to a first input of an automatic phase control detecting circuit (hereinafter referred to as an APC detecting circuit) 6. The output of the chroma demodulator 4 is connected to a chroma demodulated signal output terminal 10. On the other hand, the output of the synchronizing separating circuit 8 is connected to the input of a delay circuit 9. A first output of the delay circuit 9 is connected to a switching signal input terminal 13 of the ACC detecting circuit 5 and the second input of the APC detecting circuit 6. The second output of the delay circuit 9 is connected to a switching signal input terminal 14 of the ACC detecting circuit 5 and the fourth input of the APC detecting circuit 6. A sample and hold signal output terminal 38 of the ACC detecting circuit 5 is connected to the second input of the chroma amplifier 3. The output of the APC detecting circuit 6 is connected to the input of a voltage controlled oscillator 7. The first output of the voltage controlled oscillator 7 is connected to the second input of the above described chroma demodulator 4. The second output of the voltage controlled oscillator 7 is connected to a carrier wave input terminal 12 of the above described ACC detecting circuit 5. The third output of the voltage controlled oscillator 7 is connected to the third input of the above described APC detecting circuit 6.

Now an operation of the FIG. 1 diagram will be described. The composite video signal input terminal 1 receives a composite video signal, i.e. a signal compositely including a video signal, a chroma signal and a synchronizing signal. The composite video signal undergoes extraction of a chroma signal (a signal including a carrier color signal and a burst signal) by means of the bandpass filter 2 and the chroma signal is amplified by the chroma amplifier 3, whereupon the amplified chroma signal (a) is supplied to the chroma demodulator 4, the ACC detecting circuit 5 and the APC detecting circuit 6. On the other hand, the composite signal also undergoes separation of a horizontal synchronizing signal by means of the synchronizing separating circuit 8, whereupon the horizontal synchronizing signal is delayed by the delay circuit 9 so as to have the same timing as the above described burst signal and the same is supplied to the ACC detecting circuit and the APC detecting circuit as switching signals (c) and (d). The switching signals (c) and (d) are adapted to have the opposite polarities (see FIG. 3). The voltage controlled oscillator 7 provides a continuous carrier wave to the chroma demodulator 4, the ACC detecting circuit 5 and the APC detecting circuit 6. The APC detecting circuit 6 and the voltage controlled oscillator 7 form a phase-locked loop. More specifically, the APC detecting circuit 6 makes synchronous detection of only the burst signal based on the inputted chroma signal (a), the carrier wave and the switching signals (c) and (d) and the output thereof is supplied to the voltage controlled oscillator 7, such that the frequency and the phase of the carrier wave obtained from the voltage controlled oscillator 7 may be consistent with those of the burst signal. The ACC detecting circuit 5 provides synchronous detection of only the burst signal based on the inputted chroma signal (a), the carrier wave (b) and the switching signals (c) and (d), whereupon the output is sampled and held and the sampled and held signal (e) is supplied to the chroma amplifier 3. The chroma amplifier 3 performs an automatic color control such that the amplitude of the burst signal in the chroma signal (a) may be constant as a function of the sampled and held signal (e). The chroma demodulator 4 performs chroma demodulation based on the inputted chroma signal (a) and the carrier wave, thereby to provide a chroma demodulated signal.

Meanwhile, a detecting circuit as shown in FIG. 2 is used for the above described ACC detecting circuit 5 or the APC detecting circuit 6. FIG. 2 is a schematic diagram of a conventional detecting circuit. Now the FIG. 2 detecting circuit is described by taking an example in which the same is used for the ACC detecting circuit 5. Basically the circuit comprises a synchronous detecting circuit, a switching circuit and a sample and hold circuit. Transistors 15 to 19 and 22 constitute a synchronous detecting circuit. Transistors 20 and 21 constitute a switching circuit. Transistors 23 to 26 constitute a sample and hold circuit. The transistors 19 and 22 constitute a first differential amplifying circuit. More specifically, the base of the transistor 19 and the base of the transistor 22 are connected to the chroma signal input terminal 11. The emitter of the transistor 19 and the emitter of the transistor 22 are connected to the junction B, which is connected to the ground through a constant current source 29. The collector and the emitter of each of the transistors 19 and 22 are connected to the collector and the emitter of each of the switching transistors 20 and 21, respectively. The base of each of the transistors 20 and 21 is connected to the switching signal input terminal 13. The transistors 15 and 16 constitute a second differential amplifier and the transistors 17 and 18 constitute a third differential amplifier, such that the second and the third differential amplifiers may be connected in a dual balance type. More specifically, the base of the transistor 15 and the base of the transistor 16 are connected to the carrier wave input terminal 12. The emitter of the transistor 15 and the emitter of the transistor 16 are connected to the collector of the transistor 19. Similarly, the base of the transistor 17 and the base of the transistor 18 are connected to the carrier wave input terminal 12. The emitter of the transistor 17 and the emitter of the transistor 18 are connected to the collector of the transistor 22. The collector of the transistor 15 and the collector of the transistor 17 are connected to the voltage source input terminal 27. The collector of the transistor 16 and the collector of the transistor 18 are connected to the junction A, which is connected through a resistor 28 to a voltage source input terminal 27. The junction A constitutes a detected signal output. The junction A is connected to the base of the transistor 23. The collector of the transistor 23 is connected to the voltage source input terminal 27. The emitter of the transistor 23 is connected through a resistor 30 to the base of the transistor 24. The collector of the transistor 24 is connected to the voltage source input terminal 27. The emitter of the transistor 24 is connected through a resistor 33 to the sample and hold signal output terminal 38. A holding capacitor 34 is connected between the sample and hold signal output terminal 38 and the ground. The transistors 25 and 26 constitute a differential amplifier. The emitter of the transistor 25 and the emitter of the transistor 26 are connected through a constant current source 32 to the ground. The collector of the transistor 25 is connected to the base of the transistor 24. The base of the transistor 25 is connected to a bias voltage source 31. The collector of the transistor 26 is connected to the emitter of the transistor 24. The base of the transistor 24 is connected to the switching signal input terminal 14.

Now an operation of the FIG. 2 diagram will be described with reference to FIG. 3. FIG. 3 is a graph showing waveforms of the signals at various portions of the FIG. 2 diagram. The chroma signal input terminal 11 receives the above described chroma signal (a). The chroma signal (a) includes a carrier color signal $a_1$ and a burst signal $a_2$. The carrier wave input terminal 12 receives the above described carrier wave (b), not shown. The switching signal input terminal 13 receives the above described switching signal (c). The switching signal (c) assumes the low level during a period in which the burst signal $a_2$ is obtained (referred to as a burst signal period hereinafter), and assumes the high level during the remaining period. Conversely, the above described switching signal (d) assumes the high level during the burst signal period and assumes the low level during the remaining period. The transistors 20 and 21 are turned off only during the burst signal period as a function of the switching signal (c). Accordingly, the transistors 19 and 22 operate as a detector only during the burst signal period and therefore a product of the carrier wave (b) supplied to the carrier wave input terminal 12 and the burst signal $a_2$ is evaluated, whereby the burst signal $a_2$ is synchronously detected and the output is obtained as a burst signal $a_2'$ at the junction A. The signal obtained at the junction A is supplied to the transistor 23 and the same is sampled only during the burst signal period as a function of the switching signal (d) while the same is held during the non-burst signal period, whereupon the above described sampled and held signal (e) is obtained at the sample and hold signal output terminal 38.

Now the potential $V_A$ at the junction A will be described. Let it be assumed that the source voltage applied to the voltage source input terminal 27 is $V_{cc}$, the current value of the constant current source 29 is $I_0$, and the resistance value of the resistor 28 is R. First the direct current voltage $V_0$ of the potential $V_A$ at the junction A in the absence of the chroma signal will be described. Since the switching signal (c) assumes the high level during the non-burst signal period, the transistors 20 and 21 are turned on and accordingly the transistors 19 and 22 are short-circuited, whereby the circuit does not perform a detecting operation and hence the current $I_0$ of the constant current source 29 flows equally into the transistors 20 and 21 as $I_0/2$ for each, in which case the current $I_0/2$ flowing through one flows through the resistor 28 and the current $I_0/2$ flowing through the other flows directly from the voltage source. Accordingly, the direct current potential $V_0$ becomes as follows:

$$V_0 = V_{cc} - R \cdot I_0/2 \tag{1}$$

Since the switching signal (c) assumes the low level during the burst signal period, the transistors 20 and 21 are turned off. Accordingly, the circuit performs the detecting operation. However, since the current $I_0$ of the constant current source 29 flows equally through the transistors 19 and 22 as $I_0/2$ for each, the direct current potential $V_0$ becomes as follows as described previously:

$$V_0 = V_{cc} - R \cdot I_0/2 \tag{2}$$

Accordingly, the direct current potential $V_0$ is not changed even by the level change of the switching signal (c). Now in the presence of the chroma signal, the burst signal is detected as described previously during the burst signal period and therefore the potential $V_A$ at the junction A becomes the direct current potential $V_0$ superimposed on the burst signal $a_2'$.

As described in the foregoing, in the conventional detecting circuit, two transistors, i.e. the transistors 20 and 21 were required as a switching means for performing a detecting operation only during the burst signal period. Furthermore, although the detected signal is normally sampled and held, in the conventional detecting circuit the direct current potential $V_0$ out of the potential $V_A$ at the junction A is not changed for the burst signal period and the non-burst signal period, as described previously, and therefore the sample and hold circuit becomes complicated. More specifically, referring to FIG. 2, the sample and hold circuit 39 requires the buffer transistor 23 and the resistor 30 as a means for providing a changing voltage for cutting off the transistor 24 during the non-burst signal period. Although such detecting circuit has been incorporated recently in an integrated circuit, it is desired that the number of devices can be decreased and hence the scale of integration can be decreased as much as possible in view of a recent increasing scale of integration of such integrated circuits.

SUMMARY OF THE INVENTION

Briefly described, the present invention comprises a detecting circuit, comprising: synchronous detecting means having a first input portion receiving a signal to be detected, a second input portion receiving a carrier wave, a constant current source junction coupled to a constant current source, and a detected signal output portion providing a detected signal, and for synchronously detecting said signal to be detected as a function of said carrier wave; and switching means coupled to said detected signal output portion and said constant current source junction and responsive to an externally provided switching signal for short-circuiting said detected signal output portion and said constant current source junction.

According to the present invention, the switching means is turned on when the switching signal assumes the high level, for example, so that the detected signal output portion and the constant current source junction are short-circuited, whereby the synchronous detecting circuit does not perform a detecting operation. Conversely, the switching means is turned off when the switching signal assumes the low level, for example, whereby the synchronous detecting circuit conducts a detecting operation. Therefore, according to the present invention, it was confirmed that substantially the same operation as that of a conventional detecting circuit can be performed with a simple circuit configuration. Furthermore, according to the present application, at the detected signal output portion a difference in the direct current potential between when the switching means is turned on and becomes large when the same is turned off. Accordingly, by using the above described change in the direct current potential as a control signal of the sample and hold circuit, the sample and hold circuit can be simplified.

Accordingly, a principal object of the present invention is to provide a detecting circuit having the same function as that of a conventional detecting circuit and having a decreased number of devices as compared with a conventional detecting circuit.

According to the present invention, a switching operation of a synchronous detecting circuit can be achieved by a single transistor and therefore a circuit configuration can be simplified. Furthermore, since the change of the direct current voltage at the detected signal output is large, the sample and hold circuit can also be simplified by using the change of the direct current potential as a control signal of the sample and hold circuit. Accordingly, the scale of integration is not so increased as compared with conventional case in implementing the inventive detecting circuit and sample and hold circuit in an integrated circuit.

Furthermore, since a single kind of switching signal may be used in the case where the inventive detecting circuit is used in combination with the sample and hold circuit, a peripheral circuit can also be simplified.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Now an embodiment of the present invention will be described with reference to the drawings.

Figure 4:
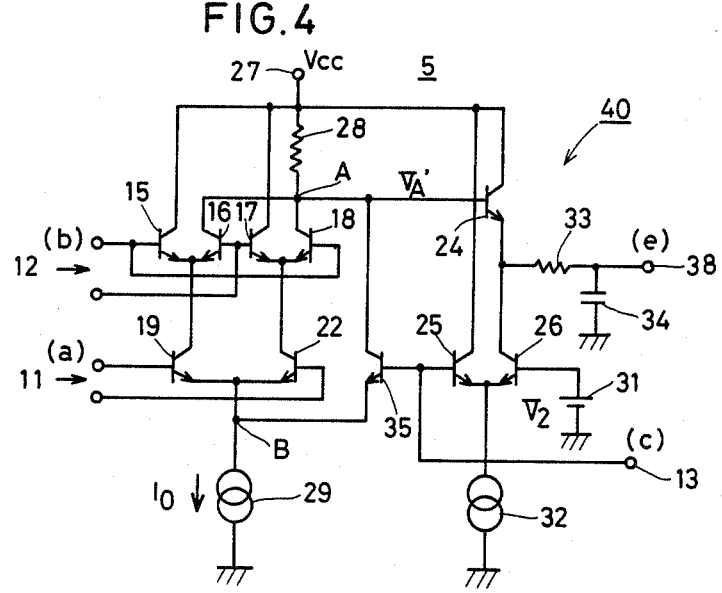
FIG. 4 is a schematic diagram of one embodiment of the present invention.

FIG. 4 is a schematic diagram of one embodiment of the present invention. In the following the differences of the embodiment from the conventional detecting circuit will be mainly described. The transistors 19 and 22 have no such switching transistors 20 and 21 as employed conventionally. Instead, the collector of the transistor 35 is connected to the junction A and the emitter of the transistor 35 is connected to the junction B. The base of the transistor 35 is connected to the base of the transistor 25 and the switching signal input terminal 13. The base of the transistor 26 is connected to the bias voltage source 31. Furthermore, the sample and hold circuit 40 has no such transistor 23 and resistor 30 as employed in the conventional sample and hold circuit 39 and the base of the transistor 24 is directly connected to the junction A. The collector of the transistor 25 is also directly connected to the voltage source input terminal 27.

Figure 5:
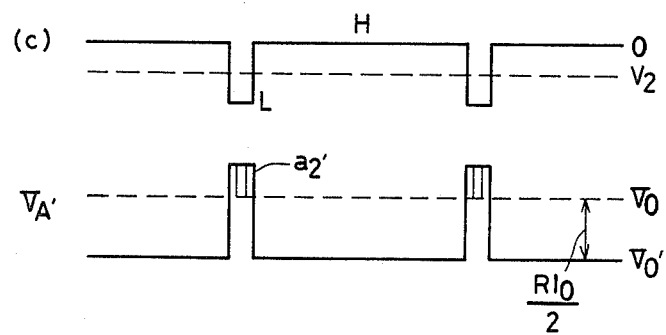
FIG. 5 is a graph showing waveforms of the signals at the major portion in the FIG. 4 diagram.

Now the operation of the FIG. 4 diagram will be described with reference to FIG. 5. FIG. 5 is a graph showing waveforms of the signals at the major portion in the FIG. 4 diagram. The chroma signal (a) is supplied to the chroma signal input terminal 11 and the carrier wave (b) is supplied to the carrier wave input terminal 12 and the switching signal (c) is supplied to the switching signal input terminal 13, as done in the conventional circuit. However, since the sample and hold circuit 40 operates as a function of the switching signal (c) supplied to the switching signal input terminal 13, the switching signal (d) is not required as is different from the conventional detecting circuit. First the switching signal (c) assumes the high level during the non-burst signal period and the transistor 35 is turned on, whereby the junctions A and B are short-circuited by the transistor 35 and the circuit does not perform a detecting operation. Now during the burst signal period the switching signal (c) assumes the low level and the switching transistor 35 is turned off, whereby the circuit performs a detecting operation. Accordingly, in the same manner as in the conventional circuit, only the burst signal $a_2$ is synchronously detected and the same is obtained at the junction A as a burst signal $a_2'$.

Now the potential at the junction A will be described as in the case of the conventional detecting circuit. Let it be assumed that the source voltage applied to the voltage source input terminal 27 is $V_{cc}$, the direct current value of the constant current source 29 is $I_0$ and the resistance value of the resistor 28 is R, as in the conventional case. First the direct current potential $V_0$, of the potential $V_A'$ at the junction A in the absence of the chroma signal will be described. During the non-burst signal period the switching signal (c) assumes the high level and the transistor 35 is turned on, so that no current flows at all in the synchronous detecting circuit, whereby all the current $I_0$ of the constant current source 29 flows through the transistor 35 and through the resistor 28 and therefore the direct current potential $V_0$ becomes as follows:

$$V_0' = V_{cc} - R \cdot I_0 \tag{3}$$

Now during the burst signal period the switching signal (c) assumes the low level and the transistor 35 is turned off and in the same manner as previously described the current $I_0$ of the constant current source 29 divides and flows through the transistors 19 and 22 by as $I_0/2$ for each, in which the current $I_0/2$ flowing through one flows through the resistor 28 and the current $I_0/2$ flowing through the other directly flows from the voltage source. Accordingly, the direct current potential $V_0$ becomes as follows:

$$V_0' = V_{cc} - R \cdot I_0/2 \tag{4}$$

Accordingly, the direct current potential $V_0'$ is significantly changed by the level of the switching signal (c). The change would be $R \cdot I_0/2$ in the above described example. Now in the presence of the chroma signal, during the burst signal period the burst signal is detected, as described previously, and therefore the potential $V_A'$ at the junction A is the direct current potential $V_0'$ plus the burst signal $a_2$.

As described in the foregoing, the potential $V_A'$ at the junction A undergoes a significant change between the burst signal period and the non-burst signal period and therefore the same can be simply sampled and held. More specifically, assuming that a relation of the level of the switching signal (c) and the potential $V_2$ of the bias voltage source 31 is determined as $V_2$ between the high level and the low level of the switching signal (c), as shown in FIG. 5, then both the transistors 26 and 24 are turned on during the burst signal period to form an emitter follower circuit, whereby the holding capacitor 34 is charged to the potential $V_A'$. Meanwhile, the resistor 33 is a time constant adjusting resistor. Now, during the non-burst signal period, the base potential of the transistor 24 is rapidly decreased, as described previously, and the transistor 24 is reverse biased to be turned off. The transistor 26 is also turned off in place of turning on of the transistor 25. Accordingly, the potential of the holding capacitor 34 is held.

Figure 1:
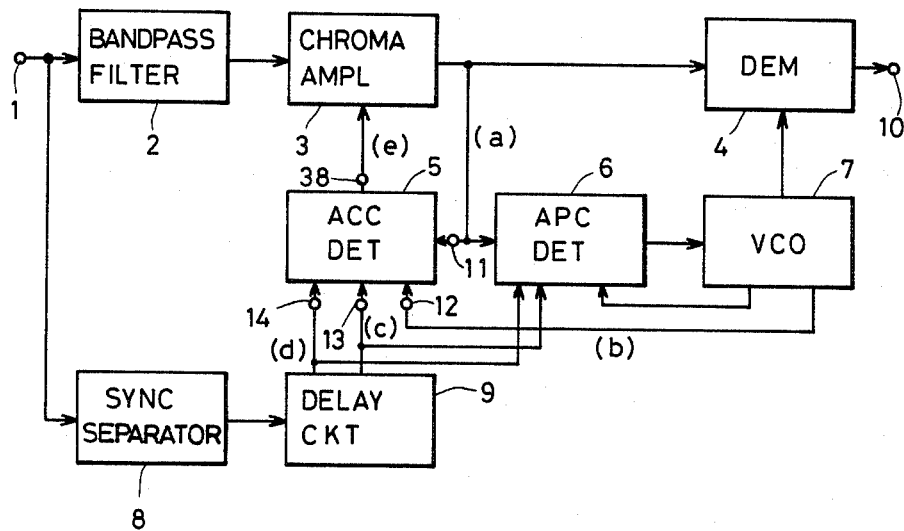
FIG. 1 is a block diagram showing a portion of a processing circuit of a chroma signal of a color television receiver which constitutes the background of the invention.
Figure 2:
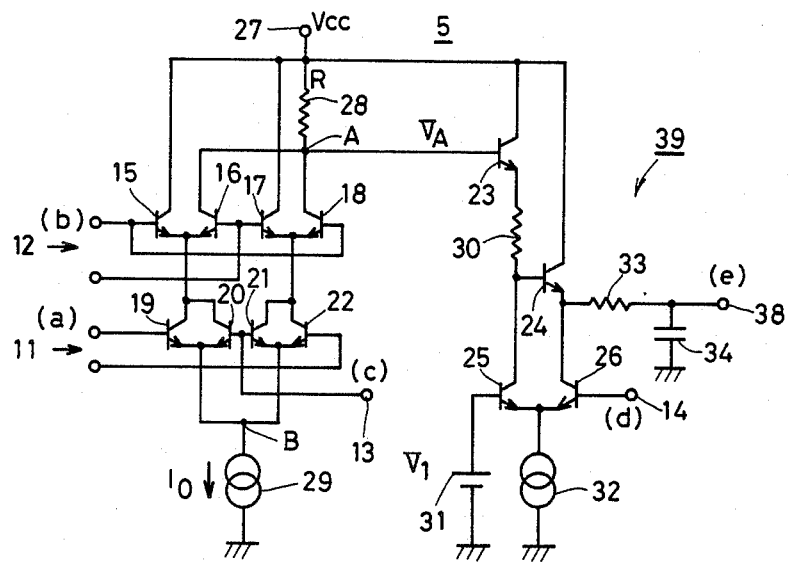
FIG. 2 is a schematic diagram of a conventional detecting circuit.
Figure 3:
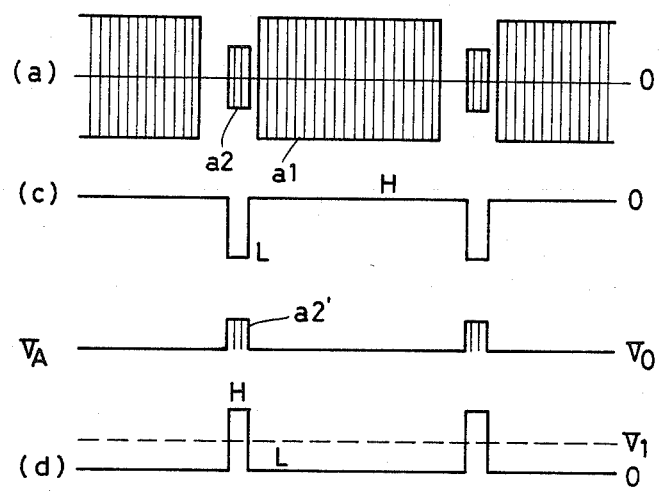
FIG. 3 is a graph showing waveforms of the signals at various portions in the FIG. 2 diagram.
Figure 6:
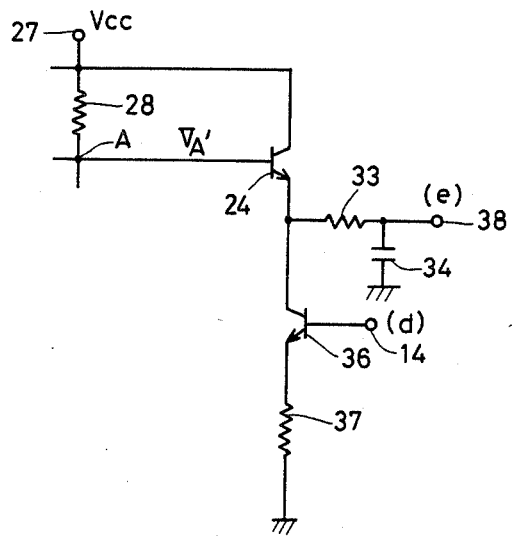
FIG. 6 is a schematic diagram of another example of the sample and hold circuit for use in the present invention.

Meanwhile, according to the present invention, a simpler sample and hold circuit may be employed. FIG. 6 is a schematic diagram of another sample and hold circuit for use in the present invention. The difference thereof from the FIG. 4 sample and hold circuit 40 is that the transistors 25 and 26 constituting the differential amplifier and the bias voltage source 31 are omitted and the above described switching signal (d) (see FIG. 3) of the base of the transistor 36 out of the transistor 36 and the resistor 37 constituting the constant current source 32 is supplied. In the same manner as described previously, the transistors 24 and 36 are turned on only during the burst signal period and are turned off during the non-burst signal period and therefore the potential $V_A'$ at the junction A is sampled and held in the holding capacitor 34.

Finally, it is pointed out that the inventive detecting circuit can be employed not only as the above described ACC detecting circuit but also as an APC detecting circuit, a color killer detecting circuit and the like.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A detecting circuit, comprising:
    synchronous detecting means having a first input portion receiving a signal to be detected, a second input portion receiving a carrier wave, a constant current source junction coupled to a constant current source and a detected signal output portion for providing a detected signal, and for synchronously detecting said signal to be detected as a function of said carrier wave, and
    switching means coupled to said detected signal output portion and said constant current source junction and responsive to an externally provided switching signal for short-circuiting said detected signal output portion and said constant current source junction.

2. A detecting circuit in accordance with claim 1, wherein
    said synchronous detecting means comprises
        a first differential amplifier having said first input portion, an output portion and said constant current source junction,
        second and third differential amplifiers each coupled to the output portion of said first differential amplifier and having said second input portion and said detected signal output portion, and being connected in a dual balance arrangement, and
        a constant current source coupled to said constant current source junction for providing a constant current thereto.

3. A detecting circuit in accordance with claim 2, wherein
    said switching means comprises
        a transistor having conduction electrodes coupled to said detected signal output portion and said constant current source junction and having a control electrode receiving said switching signal.

4. A detecting circuit in accordance with claim 2, which further comprises
    a sample and hold circuit means coupled to said detected signal output portion for sampling and holding said detected signal.

5. A detecting circuit in accordance with claim 4, wherein
    said sample and hold circuit means is structured to be responsive to said switching signal to make perform a sample and hold operation.

6. A detecting circuit in accordance with claim 4, wherein
    said signal to be detected is a chroma signal of a color television, and
    said switching signal is a gate signal adapted to have a timing for switching a burst signal in said chroma signal.

7. A detecting circuit in accordance with claim 2, wherein
    said signal to be detected is a chroma signal of a color television, and
    said switching signal is a gate signal adapted to have a timing for switching a burst signal in said chroma signal.

8. A detecting circuit in accordance with claim 1, wherein
    said switching means comprises
        a transistor having conduction electrodes coupled to said detected signal output portion and said constant current source junction and having a control electrode receiving said switching signal.

9. A detecting circuit in accordance with claim 1, which further comprises
    a sample and hold circuit means coupled to said detected signal output portion for sampling and holding said detected signal.

10. A detecting circuit in accordance with claim 9, wherein
    said sample and hold circuit means is structured to be responsive to said switching signal to perform a sample and hold operation.

11. A detecting circuit in accordance with claim 9, wherein said signal to be detected is a chroma signal of a color television, and said switching signal is a gate signal adapted to have a timing for switching a burst signal in said chroma signal.

12. A detecting circuit in accordance with claim 1, wherein said signal to be detected is a chroma signal of a color television, and said switching signal is a gate signal adapted to have a timing for switching a burst signal in said chroma signal.

13. In a circuit for synchronous detection of a color television chroma signal, having a synchronous detecting circuit means, sample-and-hold means, first input means for a switching signal, second input means for a carrier wave and third input means for a chroma signal, the improvement comrpising:

changing means for causing a voltage level at an input to said sample and hold means to change in accordance with a signal level of said switching signal; and connecting means for providing said changeable voltage level to said sample-and-hold means to provide an output indicative of a status of said switching signal.

14. An improved circuit as recited in claim 13, wherein:

said changing means and said connecting means form an automatic color control detecting circuit.

15. An improved circuit as recited in claim 13, wherein:

said changing means and said connecting means form an automatic phase control detecting circuit.

16. An improved circuit as recited in claim 13, wherein:

said sample-and-hold means comprises a pair of transistors having connected emitters receiving current from a constant current source, one of said pair of transistors having a base connected to said switching signal and a collector connected to a voltage source, and the other of said pair of transistors having a collector connected via a further transistor to the voltage source, said further transistor having a base terminal connected to receive said changeable voltage level.

17. An improved circuit as recited in claim 13, wherein:

said sample-and-hold means comprises a pair of transistors having connected emitters receiving current from a constant current source, one of said pair of transistors having a base connected to said switching signal and a collector connected to a voltage source, the other of said pair of transistors having a collector connected via a further transistor to the voltage source, said further transistor having a base terminal connected to receive said changeable voltage level, and further comprising another transistor having a base connected to said switching signal and a collector connected to the base terminal of said further transistor.

18. In a circuit for synchronous detection of a color television chroma signal, having a synchronous detecting circuit means, sample-and-hold means, first input means for a switching signal, second input means for a carrier wave and third input means for a chroma signal, said switching signal having different voltage levels at times of application of said burst signal and said carrier signal of said chroma signal, the improvement comprising:

changing means for causing a voltage level at an output of said synchronous detecting circuit means to change in accordance with a signal level of said switching signal; and connecting means for providing said changeable voltage level to said sample-and-hold means to provide an output indicative of a status of said switching signal.

* * * * *